Patented Dec. 22, 1931

1,837,199

UNITED STATES PATENT OFFICE

JOHANNES BRODE, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF ALUMINUM CHLORIDE FREE FROM IRON

No Drawing. Application filed August 5, 1929, Serial No. 383,791, and in Germany August 17, 1928.

The present invention relates to the production of aluminum chloride free or practically free from iron and in particular iron chloride.

In the manufacture and production of anhydrous aluminum chloride from clay, bauxite, or other raw materials by the usual processes, in consequence of the natural iron content of the initial material, aluminum chloride contaminated with iron chloride is obtained, which cannot be obtained in a pure state by fractional condensation at different temperatures, because the chlorides partially dissolve one in another.

In order to purify the aluminum chloride from its iron content it has been proposed to pass the chloride mixture, in the form of vapour, over metallic aluminum or iron or over base metals, such as sodium, magnesium and the like. This process has the objection that the chloride mixture to be purified must be passed over the metal chosen or through a melt thereof with the complete exclusion of gases having an oxidizing action. When producing aluminum chloride from the raw materials containing oxides with the aid of chlorine and carbonaceous reducing agents, the vapours leaving the reaction furnace always contain carbon dioxide. If such aluminum chloride vapour containing carbon dioxide is passed directly over iron or aluminum turnings or through molten aluminum for the purpose of purification, at the temperature necessary for the reaction:

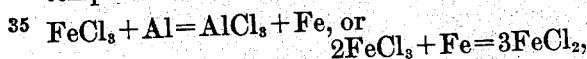

oxidation of the metallic aluminum or iron by the carbon dioxide occurs, and the metals thus oxidized on the surface can no longer effect the reducing action.

Thus this purification process can only be employed when the aluminum chloride vapour, which on leaving the reaction furnace is already at the temperature necessary for the reaction for the removal of iron, is cooled, and condensed, and the condensed aluminum chloride containing iron is vaporized again.

I have now found that this difficulty is avoided, and the crude chloride is obtained in a pure or practically pure state in one operation, by bringing the aluminum chloride vapour, which contains iron trichloride, into contact with molten lead. At temperatures above its melting point lead reacts with the iron trichloride ($FeCl_3$) in the aluminum chloride, with the formation of difficultly volatile iron dichloride ($FeCl_2$) and lead chloride and a pure or practically pure aluminum chloride is obtained. In consequence of the fact that lead is not readily oxidized, aluminum chloride vapour containing carbon dioxide can be employed directly for the purification without previous treatment, without injury to the activity of the lead.

The process in accordance with the present invention is preferably carried out by passing the aluminum chloride vapour which is to be purified into the molten lead by means of an inlet beneath the surface, and then condensing the vapour after it has bubbled through the lead bath. The chlorides formed by the reaction (iron dichloride and lead chloride) float on the surface of the molten lead, and can be skimmed off, or can be dissolved out with water, from time to time.

The following examples will further illustrate how my invention may be carried out in practice, but the invention is not restricted thereto.

Example 1

135 kilograms of aluminum chloride containing 6.54 per cent of ferric chloride are vaporized in an iron vessel of 200 litres capacity by means of a slow current of nitrogen. The resulting gas and vapour mixture is pressed through a bath of 400 kilograms of fused lead, kept in a stirring vessel at about 400° C. The aluminum chloride vapours leaving the lead bath are condensed in a condensing plant lined with lead. The resulting product contains only about 0.16 per cent of ferric chloride.

Example 2

Aluminum chloride containing 2.4 per cent of ferric chloride is produced by the interaction of kaoline, carbon monoxide and chlorine. The resulting gas and vapour mixture containing a little chlorine and carbon monoxide in addition to aluminum chloride and carbon dioxide is passed directly through a bath of fused lead electrically heated to about 400° C. Ferrous chloride and small quantities of lead chloride are formed. Preferably the lead bath is stirred in order to prevent the said chlorides from forming a crust on the surface of the bath, which would obstruct the passage of the aluminum chloride vapours which are condensed by cooling. The resulting product contains less than 0.1 per cent of ferric chloride.

What I claim is:

1. The process of producing substantially pure aluminum chloride which comprises contacting vapours of aluminum chloride contaminated with ferric chloride, with fused lead.

2. The process of producing substantially pure aluminum chloride which comprises contacting the gas mixture containing aluminum chloride contaminated with ferric chloride resulting from the production of aluminum chloride, with fused lead.

3. The process of producing substantially pure aluminum chloride which comprises contacting vapours of aluminum chloride contaminated with ferric chloride, with fused lead at about 400° C.

4. The process of producing substantially pure aluminum chloride which comprises contacting the gas mixture containing aluminum chloride contaminated with ferric chloride resulting from the production of aluminum chloride, with fused lead at about 400° C.

In testimony whereof I have hereunto set my hand.

JOHANNES BRODE.